US007192649B1

(12) United States Patent
Jouet et al.

(10) Patent No.: US 7,192,649 B1
(45) Date of Patent: Mar. 20, 2007

(54) PASSIVATION LAYER ON ALUMINUM SURFACE AND METHOD THEREOF

(75) Inventors: R. Jason Jouet, Washington, DC (US); Alfred G. Stern, Upper Marlboro, MD (US); David M. Rosenberg, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 10/637,090

(22) Filed: Aug. 6, 2003

(51) Int. Cl.
*B22F 9/00* (2006.01)
*B22F 9/06* (2006.01)
*B22F 9/16* (2006.01)

(52) U.S. Cl. ............... 428/457; 428/403; 428/407; 428/650; 75/228; 75/332; 75/331; 75/340

(58) Field of Classification Search ........... 428/457, 428/403, 407, 421, 650; 75/332, 331, 340
See application file for complete search history.

(56) References Cited

U.S. PATENT DOCUMENTS

| | | | |
|---|---|---|---|
| 3,165,397 A | 1/1965 | Lobo | 75/0.5 |
| 3,318,684 A | 5/1967 | Gernes et al. | 75/0.5 |
| 3,578,436 A | 5/1971 | Becker et al. | 75/0.5 |
| 4,627,029 A * | 12/1986 | Wilson et al. | 365/107 |
| 4,770,728 A * | 9/1988 | Berg et al. | 149/11 |
| 4,889,718 A * | 12/1989 | Sugama | 428/343 |
| 5,106,691 A * | 4/1992 | Harwell et al. | 428/411.1 |
| 5,313,948 A * | 5/1994 | Murashita et al. | 600/448 |
| 5,352,424 A * | 10/1994 | Howard et al. | 423/237 |
| 5,478,413 A * | 12/1995 | Mosser et al. | 148/261 |
| 5,494,512 A * | 2/1996 | Yamamoto et al. | 106/404 |
| 5,751,018 A * | 5/1998 | Alivisatos et al. | 257/64 |
| 5,827,584 A * | 10/1998 | Akao et al. | 428/35.7 |
| 5,885,321 A | 3/1999 | Higa et al. | 75/362 |
| 5,994,530 A * | 11/1999 | Posey-Dowty et al. | 536/66 |
| 6,077,329 A | 6/2000 | Higa et al. | 75/722 |
| 6,179,899 B1 | 1/2001 | Higa et al. | 75/722 |
| 6,207,226 B1 * | 3/2001 | Igarashi | 427/195 |
| 6,259,092 B1 * | 7/2001 | Brizzolara et al. | 250/305 |
| 6,322,963 B1 * | 11/2001 | Bauer | 435/4 |
| 6,526,828 B1 * | 3/2003 | Dayan et al. | 73/579 |
| 2003/0097903 A1 * | 5/2003 | Deegan et al. | |

OTHER PUBLICATIONS

Kinetic Instability of Nanocrystalline Aluminum Prepared by Chemical Synthesis; Facile Room-Temperature Grain Growth, Haber et al., J. Am. Chem. Soc. 1988, 120, 10847-10855.

* cited by examiner

*Primary Examiner*—John J. Zimmerman
*Assistant Examiner*—Jason L. Savage
(74) *Attorney, Agent, or Firm*—Fredric J. Zimmerman

(57) ABSTRACT

A protective passivation layer is formed on the surface of an aluminum mass, such as bare aluminum particles, creating a protected aluminum mass. Formation of the protective layer onto the aluminum mass may occur from an in-situ process.

23 Claims, 7 Drawing Sheets

NanoAl Surface Functionalization

- SAM formation conducted *in situ* after nanoAl preparation
  ➤ no oxide coating present

Monomer Size – Particle Composition

| monomer | Mass (g) Al | Mass (g) monomer* | Molar Ratios* | | |
|---|---|---|---|---|---|
| | | | Al | C | F |
| $C_{14}F_{27}O_2H$ | 0.175 | 0.94 | 1.00 | 2.85 | 5.49 |
| $C_{13}F_{25}O_2H$ | 0.175 | 0.88 | 1.00 | 2.65 | 5.09 |
| $C_{12}F_{23}O_2H$ | 0.175 | 0.81 | 1.00 | 2.44 | 4.68 |
| $C_{11}F_{21}O_2H$ | 0.175 | 0.74 | 1.00 | 2.24 | 4.27 |
| $C_{10}F_{19}O_2H$ | 0.175 | 0.68 | 1.00 | 2.04 | 3.87 |
| $C_9F_{17}O_2H$ | 0.175 | 0.61 | 1.00 | 1.83 | 3.46 |
| $C_8F_{15}O_2H$ | 0.175 | 0.55 | 1.00 | 1.63 | 3.05 |
| $C_7F_{13}O_2H$ | 0.175 | 0.48 | 1.00 | 1.42 | 2.65 |
| $C_6F_{11}O_2H$ | 0.175 | 0.41 | 1.00 | 1.22 | 2.24 |
| $C_5F_9O_2H$ | 0.175 | 0.35 | 1.00 | 1.02 | 1.83 |

*Assumes a molar ratio of 4.93:1 Al to monomer

FIGURE 5

PASSIVATION LAYER ON ALUMINUM SURFACE AND METHOD THEREOF

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND OF THE INVENTION

1. Field of the Invention

The present invention provides a passivation layer on a bare aluminum mass.

2. Brief Description of the Related Art

Aluminum particles may be prepared by metal vapor condensation techniques or decomposition of $AlH_3$—$NR_3$. These aluminum particles have been passivated by oxygen, with the oxygen forming a shell of aluminum oxide ($Al_2O_3$) over the core of aluminum or by adding the particles to a halogenated polymer slurry and allowing the polymer to set. Both of these methodologies allow oxygen to penetrate to the core of the particle and continue oxidation of the metal center over time and exposure to air. With the continued oxidation, the energy obtained during the combustion results in less than the theoretical maximum either from the incomplete combustion of the aluminum particle, i.e., the oxide layer prevents or retards combustion, or from a large amount of the aluminum, such as from 20% to 40%, is already fully oxidized prior to combustion. For example, U.S. Pat. No. 6,179,899 to Higa et al. discloses passivation of an aluminum powder product in the reaction vessel either by exposing the solution to air before product separation or by controlling the admission of air to the separated, dried powder.

There is a need in the art to provide an improved method for, and product of, passivated aluminum masses, particularly aluminum masses that contain a large amount of pure aluminum. The present invention addresses this and other needs.

SUMMARY OF THE INVENTION

The present invention includes a protected aluminum mass comprising a bare aluminum mass and an attached layer to the surface of the bare aluminum mass comprising at least one carbon atom. The attached layer may include a moiety resulting from a carboxylic acid derivative, alcohol derivative, thiol derivative, aldehyde derivative, amide derivative or combinations thereof. The protected aluminum mass of the present invention is particularly useful in small sized aluminum particles used in energetic materials, such as explosives, pyrotechnics, gas generators and the like.

The present invention also includes a process for forming a protected aluminum mass comprising the steps of forming an unprotected aluminum mass and adding a layer forming reactant, wherein the layer forming reactant binds to the surface of the aluminum mass as an attached protective layer.

DETAILED DESCRIPTION OF THE PREFERRED EMBODIMENT

The present invention provides for novel coatings for one or more bare or unprotected aluminum masses, of various sizes, to protect the aluminum mass from oxidative forces. Unpassivated aluminum mass, such as aluminum particles, are passivated with a protective layer, preferably by use of the in-situ formation of a passivation layer on the surface of the aluminum particles. As such, the protective coating increases the usefulness of the aluminum mass by making the aluminum mass non-reactive in non-inert environments, e.g., when exposed to an oxygen containing atmosphere. The coating includes an attached layer on the surface of the aluminum which protects the aluminum mass from combining with non-aluminum components, particularly oxygen. This layer preferably comprises a mono-layer structure attached to the aluminum.

Figure 1:
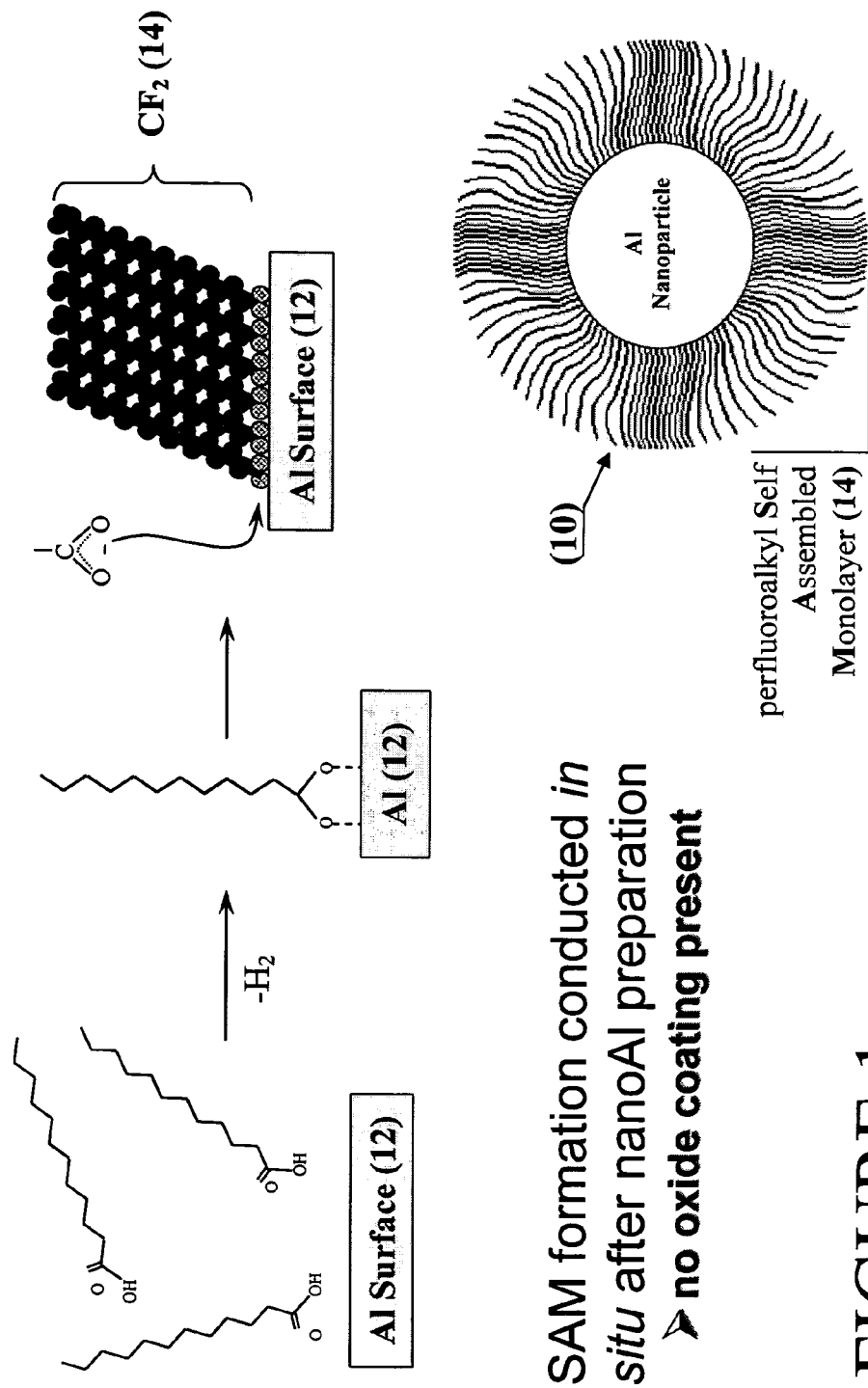
FIG. 1 illustrates formation of a self assemble monolayer (SAM) passivated aluminum (Al) particle of the present invention, designated as SAM:Al.

As seen in FIG. 1, the formation of a self assemble monolayer (SAM) passivated aluminum (Al) surface, such as a particle, 10 of the present invention, designated herein as SAM:Al or Al:SAM, includes a protected aluminum mass 10 comprising bare aluminum 12 with an attached layer 14 on its surface. The bare aluminum 12 may be formed from any appropriate process for producing purified aluminum, also referred to herein as "bare" or unprotected aluminum. Bare aluminum 12, particularly in the form of pure fine powders, is pyrophoric. Methods of production include, for example without limitation, process disclosed in U.S. Pat. No. 6,179,899 to Higa et al. (referred to herein as the "Higa Patent"), the disclosure of which is hereby incorporated by reference for teaching bare aluminum production. The Higa Patent references several methods for producing aluminum powders. These methods include exploding aluminum wire in a vacuum by a high electric current; condensation of vaporized aluminum in a current of cold inert gas, plating aluminum on a substrate by the decomposition of a tertiary amine complex of aluminum hydride in vapor form at pressures of up to 30 mm of mercury without a catalyst and at temperatures of 125° C. to 550° C., and citing U.S. Pat. No. 3,462,288 for plating aluminum on a substrate from an alkyl or aryl substituted aluminum hydride complexed with an ether or a nitrogen containing compound and catalyzed. The Higa Patent further cites U.S. Pat. Nos. 3,535,108 and 3,578,436 for methods for producing purified aluminum in particulate form by the conversion of "crude" aluminum to a dialkylaluminum hydride followed by decomposition of the dialkylaluminum hydride at room to 260° C., and a related method of decomposition of diethylhydridoaluminum or diisobutylhydridoaluminum in diisopropyl ether or triethylamine at 90° C. to 185° C. to produce 99.97 percent pure particulate aluminum along with twice the molar quantity of the corresponding trialkylaluminum (using titanium isopropoxide catalyst in an amount by weight of 1 part per 3000 parts aluminum produced). The Higa patent discloses fine aluminum powders prepared by decomposing alane-adducts in organic solvents under an inert atmosphere to provide uniform sized particles from about 65 nm to about 500 nm with titanium catalyst provided as a halide, amide, and alkoxide, other titanium compounds and the corresponding catalyst compounds of zirconium, hafnium, vanadium, niobium, and tantalum. Of note is the disclosure in the Higa Patent for the passivation of the produced aluminum powder product in the reaction vessel either by exposing the solution to air before product separation or by controlling the admission of air to the separated, dried powder.

Preferably, formation of the unprotected aluminum mass occurs in an inert environment, generally through decomposition of an aluminum composition. Representative examples of forming aluminum masses include fine aluminum powders formed under an inert atmosphere, such as argon, helium, neon or other like gases. Under this atmosphere, decomposition reactions of alane adducts, including for example without limitation trialkyl (NRR'R"), heterocyclic, and aromatic amines such as trimethylamine, dimethylethylamine, triethylamine, methyldiethylamine, tripropylamine, triisopropylamine, tributylamine, tetramethylethylenediamine (TMEDA), N-methylpyrrolidine, and pyridine; and ethers (ROR') such as dimethyl ether, diethyl ether, propyl ether, isopropyl ether, dioxane, tetrahydrofuran, dimethoxymethane, diglyme, triglyme, and tetraglyme) occur in organic solvent solutions containing a catalyst. N-methylpyrrolidine, $CH_3N(\eta_2—C_4H_8)$, is the preferred alane adduct. The solvent includes any appropriate aromatic solvent such as toluene, benzene, and mesitylene; a polar solvent such as diethyl ether, propyl ether, isopropylether, dimethoxymethane, tetrahydrofuran, diglyme, triglyme, and tetraglyme; an aliphatic solvent such as hexane, heptane, octane, and nonane; or an amine such as triethylamine, tripropylamine, triisopropylamine, and pyridine, with toluene, TMEDA, xylene and dioxane preferred. Appropriate catalyst include, for example without limitation, compounds of titanium, zirconium, hafnium, vanadium, or niobium including a halide such as $TiX_4$, $ZrX_4$, $HfX_4$, $VX_3$, $VX_4$, $VOCl_3$, $NbX_3$, $NbX_4$, $NbX_5$, $TaX_5$ where X=F, Cl, Br, I; an alkoxide such as $Ti(OR)_4$, $Zr(OR)_4$, $Hf(OR)_4$, $V(OR)_3$, $Nb(OR)_3$, $Nb(OR)_5$, $Ta(OR)_5$; or an amide such as $Ti(NR_2)_4$, $Zr(NR_2)_4$, $Hf(NR_2)_4$, $V(NR_2)_x$, $Nb(NR_2)_{(3,4,5)}$, $Ta(NR_2)_5$, where R is an alkyl group such as methyl, ethyl, propyl, isopropyl, butyl, or tert-butyl. Preferred catalysts include titanium (IV) chloride, $TiCl_4$; titanium (IV) isopropoxide, $(i-PrO)_4 Ti$; and titanium (IV) dimethylamide, $Ti(N(CH_3)_2)_4$.

In forming the aluminum mass, the reactions occur at desired reaction temperatures which may be attained by heating an alane adduct solution before or after adding the catalyst or by adding the alane adduct to a catalyst solution already at the reaction temperature. Variable uniform sizes of the formed aluminum particles may be created by varying the concentration of the catalyst and by varying the concentration of an adducting species, such as by adding this species in uncompounded form to a solution of an alane adduct or by using an adducting species itself as the solvent. Reaction temperatures include from about −78° C. or higher, such as room temperature to about 162° C., up to the boiling point of the selected solvent, and preferably at convenient working temperatures of from about 10° C. to about 100° C., and most preferably from about 23° C. to about 30° C. Preferably the aluminum powders are not isolated from the reaction solvent mixture and are coated with the protective attached layer in situ, as described herein. This minimizes any contamination of the aluminum mass by oxygen or nitrogen prior to the placement of the SAM onto the aluminum mass.

The aluminum mass may include any appropriate size or shape for passivation. For aluminum masses used in energetic materials, the preferred shape includes particles having oval or spherical forms, with preferred sizes of these aluminum particles being nano- or micron-sized aluminum particles.

Referring to FIG. 1, passivation of the formed aluminum powders occurs by attaching a layer of molecules onto the surface of the bare aluminum which prevent oxidation of the surface of the aluminum mass. The attached layer 14 to the surface of the bare aluminum mass 12 includes molecules containing at least one carbon atom. Preferably, the attached layer molecules 14 include a moiety of a carboxylic acid derivative, alcohol derivative, thiol derivative, aldehyde derivative, amide derivative or combinations of these derivatives. Most preferably the attached layer molecules include a carboxylic acid derivative.

The attached layer 14 preferably includes a monolayer of molecules attached to the aluminum mass. The chemical molecules comprising the monolayer may include, for example without limitation, a moiety of a carboxylic acid derivative, such as preferably having from about 3 carbon atoms to about 20 carbon atoms, and more preferably from about 9 to about 14 carbon atoms. Preferably, the carboxylic acid derivative moiety of the present invention includes a derivative of a perfluoroalkyl carboxylic acid, such as a perfluoroalkyl carboxylic acid of $C_9F_{17}O_2H$, $C_{10}F_{19}O_2H$, $C_5F_9O_2H$ or $C_{14}F_{27}O_2H$. Most preferably the perfluoroalkyl carboxylic acid comprises perfluorotetradecanoic acid $(C_{14}F_{27}O_2H)$.

Although the attached layer 14 may include any appropriate mass amount for a given purpose, preferably the attached layer 14 is present in an appropriate mass amount, such as approximately 5:1 molar ratio (aluminum:layer) for the reactions at room temperatures, which may change with changes in reaction conditions, such as reaction temperature, solvent, etc. Appropriate molar ratios may include, for example without limitation, ratios of from about 6:1; 10:1; 20:1, etc. The weight percentage of the attached layer 14 on the aluminum 12 also may be tailored to a given purpose, such as weight percentages of from about 85 weight percent or less of the total protected aluminum mass, 65 weight percent or less, 50 weight percent or less, 25 weight percent or less, and other such weight percentages including intermediate weight percentages, with variations of the weight percentage providing optimum protective coverage of the aluminum mass 12 for changes of particle size of the aluminum mass 12, changes in the molecular weight of the SAM, etc. As seen in FIG. 1, alignment of molecules of the attached layer 14 preferably forms a protective monolayer against the aluminum mass 12. With the alignment of the protective attached layer 14 as a substantially monolayer structure, a maximum amount of protection occurs with the least amount of material constituting the protective attached layer 14. This increases the amount of protected aluminum for the overall mass of the SAM:Al structure.

In one embodiment of the present invention, the attached layer molecules include at least one functional group. This functional group may include binders, stabilizers, polymerizeable moieties, energetic moieties, and other such characteristics as desirable. Preferably the attached layer molecules include an energetic moiety, such as a burning additive to an aluminum mass used in propellant compositions. With and without the inclusion of an energetic moiety, the protected aluminum mass is extremely useful in an energetic material compositions, such as propellants, explosives, pyrotechnics, and other such energetic materials that are aided with the addition of an aluminum component.

The protected aluminum mass is produced by forming the unprotected aluminum mass and adding a layer forming reactant to the formed aluminum mass that preferably occurs prior to any oxidation of the surface of the aluminum mass. The layer forming reactant binds to the surface of the aluminum mass as the attached protective layer. Preferably the step of forming the unprotected aluminum mass includes processing a composition of $AlH_3 \cdot NR_1R_2R_3$, with $R_1$, $R_2$ and $R_3$ independently being hydrogen or an alkyl having 1 to about 10 carbon atoms, that are optionally in combination with one or more heterocycles. The process results in the formation of the protected aluminum mass. In one embodiment, the process of the present invention includes a solution of known concentration of $AlH_3 \cdot NR_3$ (R=alkyl) in ether that is decomposed by the addition of a catalytic amount of $Ti(O^iPr)_4$. After the decomposition is effected and the aluminum atoms begin to nucleate, a solution of perfluoroalkyl carboxylic acid in ether is added slowly to reduce heat generation, such as dropwise. Without the use of excess complexing amine—as referenced in the Higa Patent, times of Al particle nucleation may be monitored to prevent aluminum film formation on the walls of the reaction vessel. Representative times for nucleation may include, for example without limitation, 5 minutes, 7 minutes, 10 minutes, and other such times effective for highest degree of Al particle nucleation while preventing film formation of the atomic aluminum. This allows larger Al particle sizes without film formation prior to passivation. The carboxylic acid moieties react with the aluminum surface releasing hydrogen and forming a covalent aluminum-oxygen bond thereby linking the long chain perfluoroalkyl moiety with the aluminum and coating the entire surface of the aluminum particle with a self-assembled monolayer of perfluoroalkyl carboxylic acid moieties and preventing the nucleation (Ostwald ripening) of the Al particles.

Protective layers may be incorporated onto aluminum masses, such as particles, of various shapes and sizes, either with consistent uniform masses or over a broad range of masses for a given batch of particles. Preferably, the present invention includes fine aluminum powders, such as spherical aluminum masses having particle sizes substantially less than the about 10 nm to about 200,000 nm, more preferably from about 10 nm to about 15,000 nm, and most preferably from about 10 nm to about 100 nm. With reduced size, the fine aluminum powders significantly increase the effectiveness of fuels and fuel additives, pyrotechnics, and energetic materials including composites, thermite, and explosives, generally by a factor of from about three to about ten. Increases occur from the more rapid and complete reaction of the finer particles.

The present invention provides passivated aluminum mass, particularly for nano-sized aluminum

EXAMPLE 1

A solution of $AlH_3 \cdot NMe_3$ in $Et_2O$ (25 mL; 0.213 M) was stirred at room temperature in an argon filled glove box. To this flask, 1.0 mL of a solution of $Ti(O^iPr)_4$/toluene (10 µL/mL) was added resulting in an instantaneous color change from clear colorless to dark brown to black opaque. Five minutes following the $Ti(O^iPr)_4$/toluene addition, a solution of $C_{14}F_{27}O_2H/Et_2O$ (0.095 M) was added dropwise at which time bubbles were observed. Stirring was halted and the resultant brown fluffy solid was allowed to settle, washed twice with $Et_2O$, and dried in vacuo to yield an off-white powder. The Al:SAM molar ratio in this Example 1 was 2.2:1.

EXAMPLE 2

Figure 2:
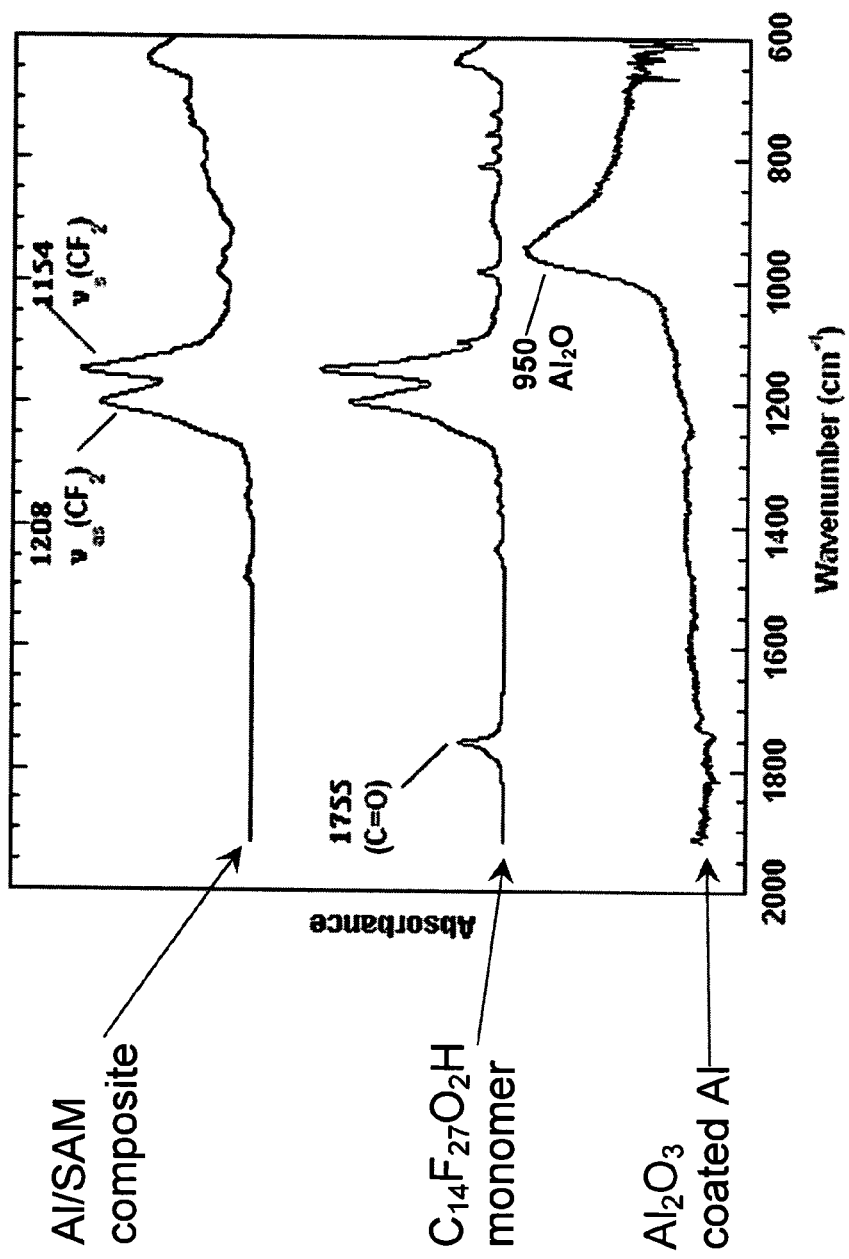
FIG. 2 is an Attenuated Total Reflectance InfraRed (ATR-IR) spectrum of $C_{14}F_{27}O_2H$/Aluminum composite of the present invention, $C_{14}F_{27}O_2H$ monomer, and oxygen passivated aluminum.
Figure 3A:
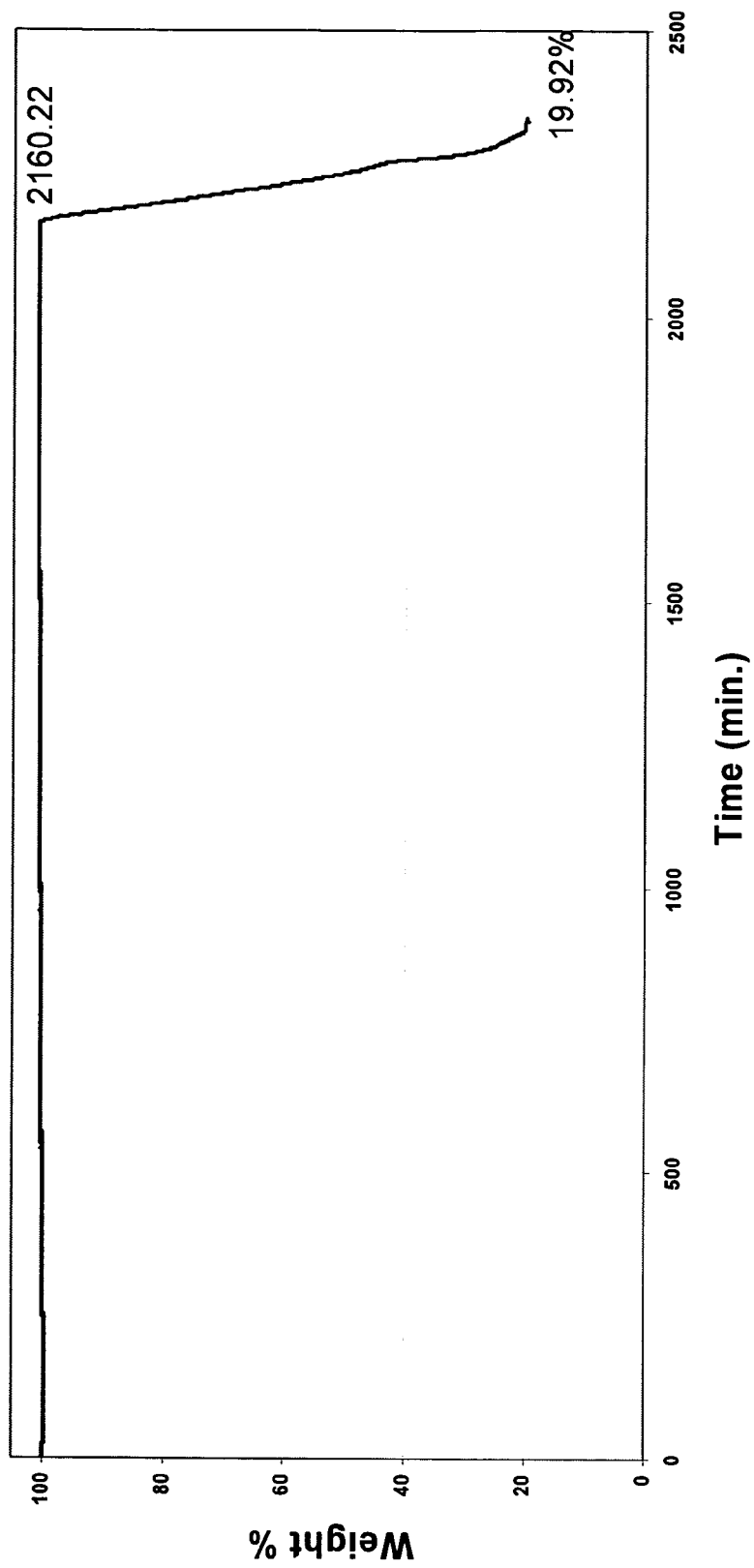
FIGS. 3a–3c are Thermogravimetric Analysis (TGA) graphs of $C_{14}F_{27}O_2H$/Aluminum composite of the present invention.
Figure 3B:
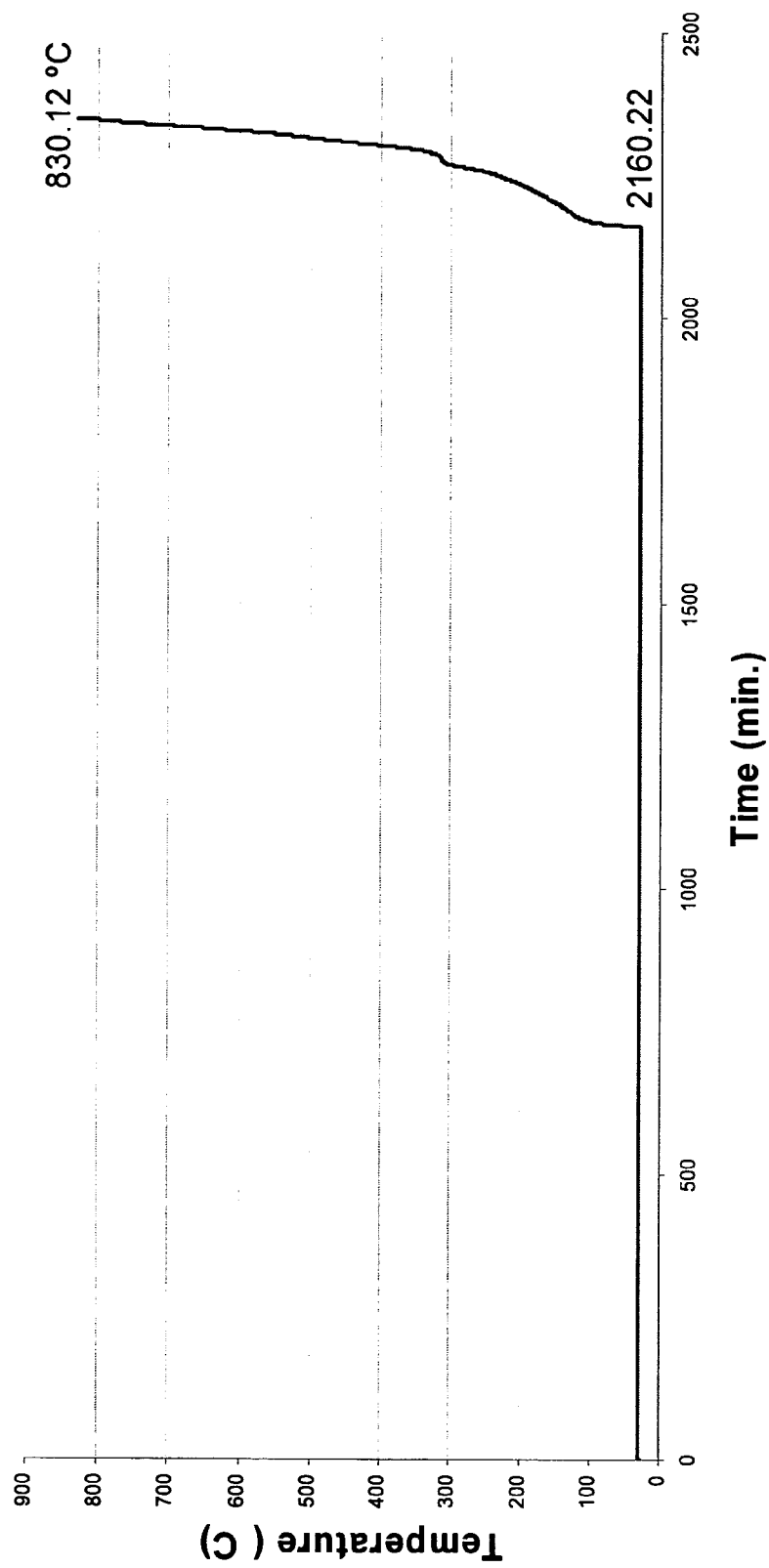
Figure 3C:
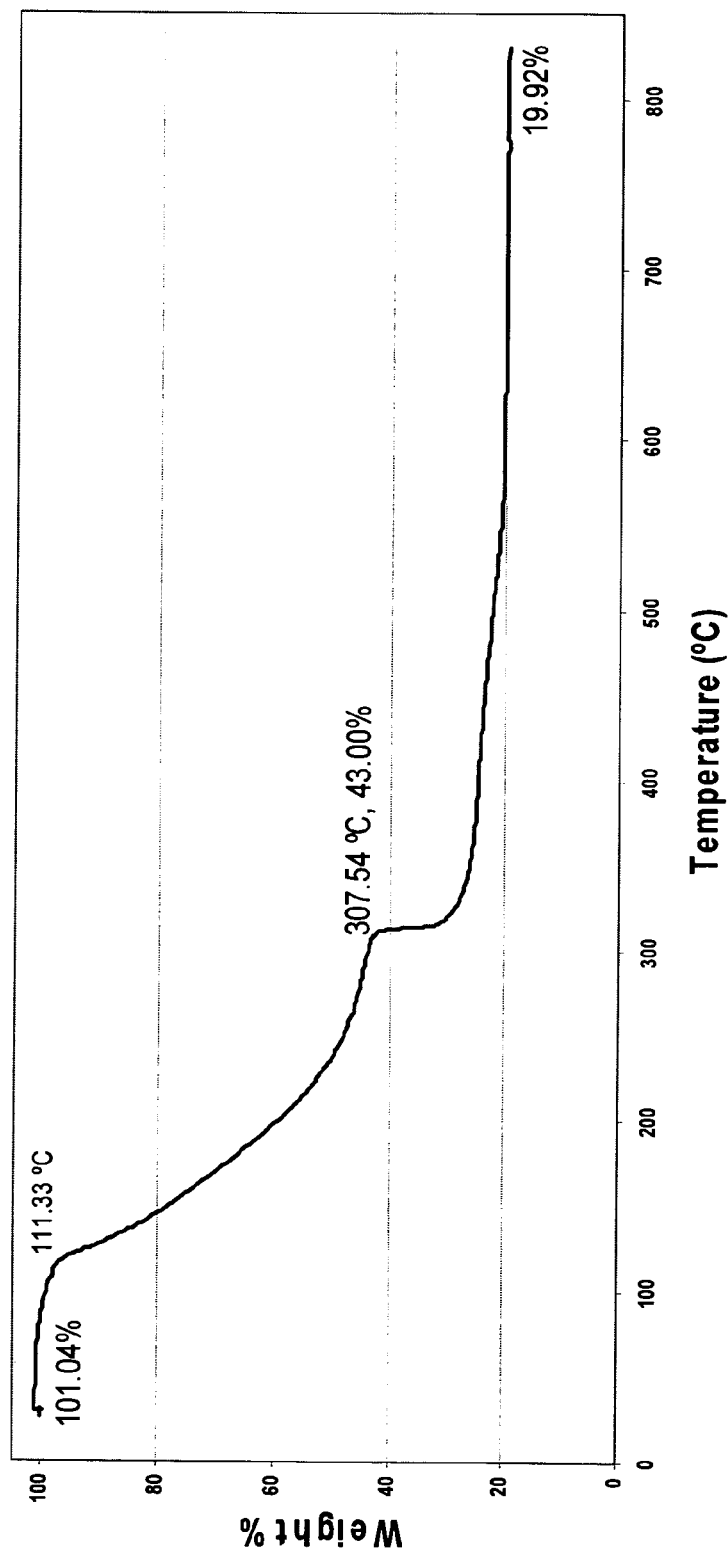
Figure 4:
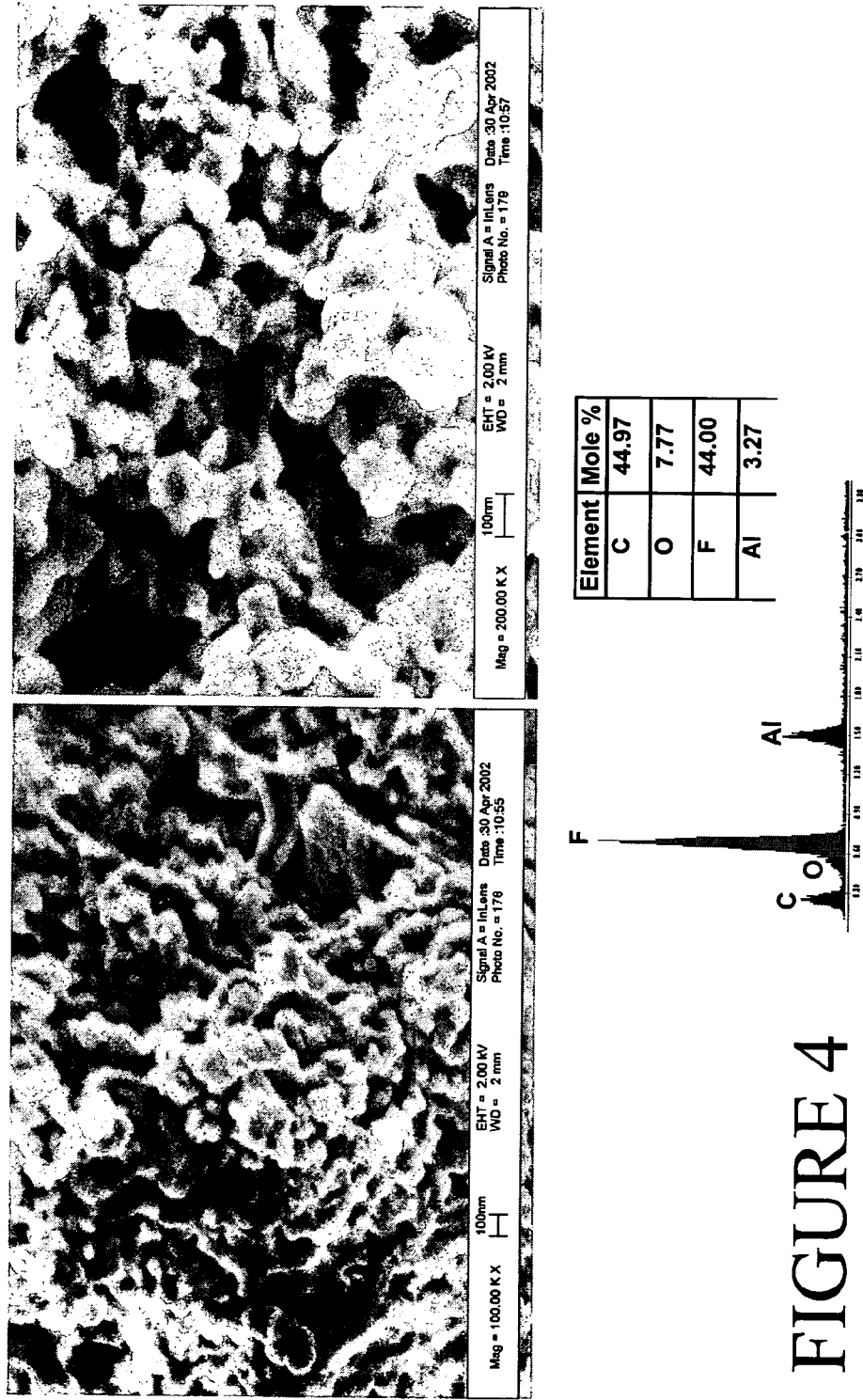
FIG. 4 is a Scanning Electron Microscopy (SEM) image and Energy Dispersive Spectroscopy (EDAX) data of $C_{14}F_{27}O_2H$/Aluminum composite of the present invention evidencing element mole percentages; and, FIG. 5 is a chart listing the monomer size—particle composition of representative SAMs of the present invention.

A solution of alane-N-methylpyrrolidine complex, $AlH_3 \cdot N(Me)Pyr$, (1.139 g, 0.0115 mol) in $Et_2O$ (30 mL) was stirred at room temperature in an argon filled glove box. To this solution, 20 µL of $Ti(O^iPr)_4$ in 1.6 mL of toluene was rapidly added via syringe. The reaction was stirred for 7 minutes, during which time the solution became dark brown in color. After 5 minutes, 20 mL of $C_{14}F_{27}O_2H/Et_2O$ (0.115 M) was added dropwise to the reaction flask at a drop rate of 3–4 drops per second. The reaction was stirred overnight, after which stirring was stopped and the reaction contents allowed to settle. The clear brown ether layer was removed by pipet from the dark gray precipitate. The precipitate was washed twice with 10 mL portions of $Et_2O$, each time removing the $Et_2O$ after the solid settled out. The precipitate was dried by allowing the residual ether to evaporate in the glove box. The resulting dark gray powder was found to be stable in air. The Al:SAM molar ratio in this Example 2 was approximately 5.0:1, showing an effective passivation of the Al material. FIG. 2 shows an Attenuated Total Reflectance InfraRed spectra (ATR-IR) of a sample of the $C_{14}F_{27}O_2H$/Aluminum composite of the present invention that was exposed to ambient air for one week, and separately the $C_{14}F_{27}O_2H$ monomer and $Al_2O_3$ coated aluminum. As seen in the spectra, the Al/SAM composite evidences two distinguishing peaks of the $C_{14}F_{27}O_2H$ monomer at approximately 1150 $cm^{-1}$ and 1200 $cm^{-1}$, while the distinguishing peak of $Al_2O_3$ coated aluminum at approximately 950 $cm^{-1}$ remains absent from the Al/SAM composite spectrum. As such, the Al/SAM composite is shown not to have been oxidized and to encompass a protective layer of the $C_{14}F_{27}O_2H$ monomer. The Al/SAM ($C_{14}F_{27}O_2H$/Aluminum) composite of the present invention shown in this Example 2 is further detailed in the thermogravimetric analysis (TGA) graph of FIG. 3. FIGS. 3(a) and 3(b) show the Al/SAM nano-composite material to exhibit approximately 1% weight gain after 2200 minutes at 30° C. in ambient air, evidencing no ongoing oxidative process from the air. Additionally, shown in FIG. 3(c), the thermoysis of aluminum in air results in a weight loss of approximately 20% of the original (while typical al TGA experiments of Al in air generally demonstrate only weight gain due to the formation of $Al_2O_3$). The FIG. 4 shows the Scanning Electron Microscopy image and Energy Dispersive Spectroscopy data (SEM/EDAX) of the $C_{14}F_{27}O_2H$/Aluminum composite of the present invention evidencing element mole percentages. The chart detailed in FIG. 5 shows a listing the monomer size-particle composition of representative SAMs of the present invention. FIG. 5 demonstrates the tailorability of the SAM:Al composites in that by increasing or decreasing the SAM monomer molecular weight while maintaining the Al particle size and mole ratio of Al:SAM, the Al:F molar ratio or the Al:SAM mass ratio can be modified for the intended application.

The process described in this Example 2 was repeated with monomers of $C_{11}F_{21}O_2H$, $C_9F_{17}O_2H$ and $C_5F_9O_2H$, resulting in SAM:Al composites of a gray powder, sticky gooey mass and gray powder, respectively.

The foregoing summary, description, and examples of the present invention are not intended to be limiting, but are only exemplary of the inventive features which are defined in the claims.

What is claimed is:

1. A protected aluminum mass, comprising:
   a bare aluminum mass; and,
   an attached layer coating a surface of the bare aluminum mass, said attached layer comprises at least one carbon atom,
   wherein said surface is an Al surface entirely absent $Al_2O_3$ where the Al surface is covalently bonded to the attached layer.

2. The protected aluminum mass of claim 1, wherein the attached layer comprises a moiety selected from at least one of a carboxylic acid derivative, alcohol derivative, thiol derivative, aldehyde derivative, and an amide derivative.

3. The protected aluminum mass of claim 1, wherein the attached layer is comprised of a moiety of a carboxylic acid derivative.

4. The protected aluminum mass of claim 1, wherein the bare aluminum mass comprises micron-size aluminum particles.

5. The protected aluminum mass of claim 1, wherein the bare aluminum mass comprises nano-size aluminum particles.

6. The protected aluminum mass of claim 1, wherein the attached layer comprises a monolayer.

7. The protected aluminum mass of claim 1, wherein the attached layer is a monolayer comprised of a moiety of a carboxylic acid derivative.

8. The protected aluminum mass of claim 1, wherein the attached layer is comprised of about 3 carbon atoms to about 20 carbon atoms.

9. The protected aluminum mass of claim 1, wherein the attached layer is comprised of about 9 carbon atoms to about 12 carbon atoms.

10. The protected aluminum mass of claim 1, wherein the attached layer is comprised of a moiety of a perfluoroalkyl carboxylic acid.

11. The protected aluminum mass of claim 10, wherein the perfluoroalkyl carboxylic acid is selected from the group consisting of $C_5F_9O_2H$, $C_9F_{17}O_2H$, $C_{10}F_{19}O_2H$ and $C_{14}F_{27}O_2H$.

12. The protected aluminum mass of claim 1, wherein the perfluoroalkyl carboxylic acid comprises $C_{14}F_{27}O_2H$.

13. The protected aluminum mass of claim 1, wherein the attached layer is present in a mass amount from at least about a 5:1 molar ratio of aluminum to layer.

14. The protected aluminum mass of claim 1, wherein the attached layer comprises at most about 85 weight percent of the total protected aluminum mass.

15. The protected aluminum mass of claim 1, wherein the attached layer includes at least one functional group.

16. The protected aluminum mass of claim 1, wherein the attached layer includes an energetic moiety.

17. An energetic material comprising the protected aluminum mass of claim 1.

18. The protected aluminum mass of claim 1, wherein said attached layer binds to said surface.

19. The protected aluminum mass of claim 1, wherein said attached layer binds to said bare aluminum mass.

20. The protected aluminum mass of claim 1, wherein a covalent aluminum-oxygen bond is formed linking said attached layer and said bare aluminum mass.

21. A process for forming a protected aluminum mass, comprising:
    forming an unprotected aluminum mass; and,
    adding a layer forming reactant, wherein the layer forming reactant coats a surface of the unprotected aluminum mass as an attached protective layer,
    wherein the surface is an Al surface entirely absent $Al_2O_3$ where the Al surface is covalently bonded to the attached protective layer.

22. The process of claim 21, wherein an aluminum composition for forming the unprotected aluminum mass comprises $AlH_3!NR_1R_2R_3$, and
    wherein $R_1$, $R_2$ and $R_3$ are independently selected from one of a hydrogen and an alkyl comprising 1 to about 10 carbon atoms, optionally in combination with at least one heterocycle.

23. The protected aluminum mass produced by the process of claim 21.

* * * * *